United States Patent
Anderson et al.

(10) Patent No.: US 8,358,296 B2
(45) Date of Patent: Jan. 22, 2013

(54) TEMPERATURE COMPENSATED MEMS DEVICE

(75) Inventors: Daryl E. Anderson, Corvallis, OR (US); Eric Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2799 days.

(21) Appl. No.: 10/757,104

(22) Filed: Jan. 13, 2004

(65) Prior Publication Data

US 2005/0152015 A1   Jul. 14, 2005

(51) Int. Cl.
*G09G 5/00* (2006.01)

(52) U.S. Cl. ....................................................... 345/211

(58) Field of Classification Search .................. 345/101; 310/309; 359/290; 256/454; 385/140
See application file for complete search history.

(56) References Cited

U.S. PATENT DOCUMENTS

| 5,088,806 | A | * | 2/1992 | McCartney et al. .......... 345/101 |
| 5,561,523 | A | * | 10/1996 | Blomberg et al. ............ 356/454 |
| 5,903,251 | A | * | 5/1999 | Mori et al. .................... 345/101 |
| 6,236,139 | B1 | | 5/2001 | Hill et al. |
| 6,275,320 | B1 | | 8/2001 | Dhuler et al. |
| 6,329,738 | B1 | * | 12/2001 | Hung et al. ................... 310/309 |
| 6,380,531 | B1 | | 4/2002 | Sugihwo et al. |
| 6,445,838 | B1 | | 9/2002 | Caracci et al. |
| 6,727,562 | B2 | * | 4/2004 | Han et al. ...................... 359/290 |
| 7,019,883 | B2 | * | 3/2006 | Moon et al. ................... 359/290 |
| 7,038,654 | B2 | * | 5/2006 | Naiki et al. ................... 345/101 |
| 7,197,225 | B2 | * | 3/2007 | Romo et al. .................. 385/140 |
| 2002/0167307 | A1 | | 11/2002 | Chaparala |
| 2002/0176648 | A1 | | 11/2002 | Bhat et al. |

* cited by examiner

*Primary Examiner* — Jimmy H Nguyen (57) ABSTRACT

A micro-electromechanical system (MEMS) includes a flexure, a voltage generator, and a temperature sensor thermally coupled to the MEMS, wherein the voltage generator is configured to produce a temperature compensated voltage in response to a thermal measurement performed by the temperature sensor.

53 Claims, 8 Drawing Sheets

TEMPERATURE COMPENSATED MEMS DEVICE

BACKGROUND

Micro-electromechanical systems (MEMS) are systems which are developed using thin film technology and include both electrical and micro mechanical components. MEMS devices are used in a variety of applications such as optical display systems, pressure sensors, flow sensors, and charge control actuators. MEMS devices use electrostatic force or energy to move or monitor the movement of micro-mechanical electrodes which can store charge. In one type of MEMS device, to achieve a desired result, a gap distance between electrodes is controlled by balancing an electrostatic force and a mechanical restoring force.

MEMS devices designed to perform optical functions have been developed using a variety of approaches. According to one approach, a deformable deflective membrane is positioned over an electrode and is electrostatically attracted to the electrode. Other approaches use flaps or beams of silicon or aluminum which form a top conducting layer. With optical applications, the conducting layer is reflective while the deflective membrane is deformed using electrostatic force to direct light which is incident upon the conducting layer.

More specifically, a MEMS technology termed Diffractive Light Devices (DLDs) produce colors based on the precise spacing of a pixel plate to related lower (and possibly upper) plates. This spacing is the result of a balance of two forces: electro-static attraction based on voltage and charge on the plates, and a spring constant of one or more "flexures" maintaining the position of the pixel plate away from the electrostatically charged plate. One traditional approach for controlling the gap distance is to apply a continuous control voltage to the electrodes, wherein the control voltage is increased to decrease the gap distance, and vice-versa. However, precise gap distance control may be affected by a variation in operating temperatures experienced by the DLD.

SUMMARY

A micro-electromechanical system (MEMS) includes a flexure, a voltage generator, and a temperature sensor thermally coupled to the MEMS, wherein the voltage generator is configured to produce a temperature compensated voltage in response to a thermal measurement performed by the temperature sensor.

BRIEF DESCRIPTION OF THE DRAWINGS

The accompanying drawings illustrate various embodiments of the present system and method and are a part of the specification. The illustrated embodiments are merely examples of the present system and method and do not limit the scope of the system and method.

Throughout the drawings, identical reference numbers designate similar, but not necessarily identical, elements.

DETAILED DESCRIPTION

The present specification discloses a system and a method for reducing thermal effects on a micro-electro mechanical device having one or more flexures. For ease of explanation only, the present system and method will be described in the context of a system and a method for reducing thermal effects on a diffractive light device (DLD) or an array of DLDs. More specifically, according to one exemplary embodiment, a plurality of thermal sensors is disposed at one or more locations on a DLD. The measurements taken by the thermal sensors are then used to approximate the temperatures of the flexures that couple the pixel plate to the DLD. After a number of signal manipulations, the thermal sensor measurements are then used to provide a temperature compensated bias voltage to the DLD pixel cells, thereby improving the stability of the color generation produced by the DLDs. A number of exemplary systems and methods for reducing the thermal effects on a DLD or other MEMS device having one or more flexures will be described below.

As used herein and in the appended claims, the terms "diffractive light device" and "DLD" are meant to be broadly understood as any device or structure that produces color by controlling the gap size between a reflective surface and one or more charge plates by balancing two forces: electro-static attraction based on voltage and charge on the plates, and a spring constant of one or more "flexures" supporting the reflective surface. Additionally, the term "Micro-Electro Mechanical System" or "MEMS" is meant to be understood broadly as describing any very small (micro) mechanical device that may be constructed on a single semiconductor chip and which may be fabricated using integrated circuit (IC) batch-processing techniques.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
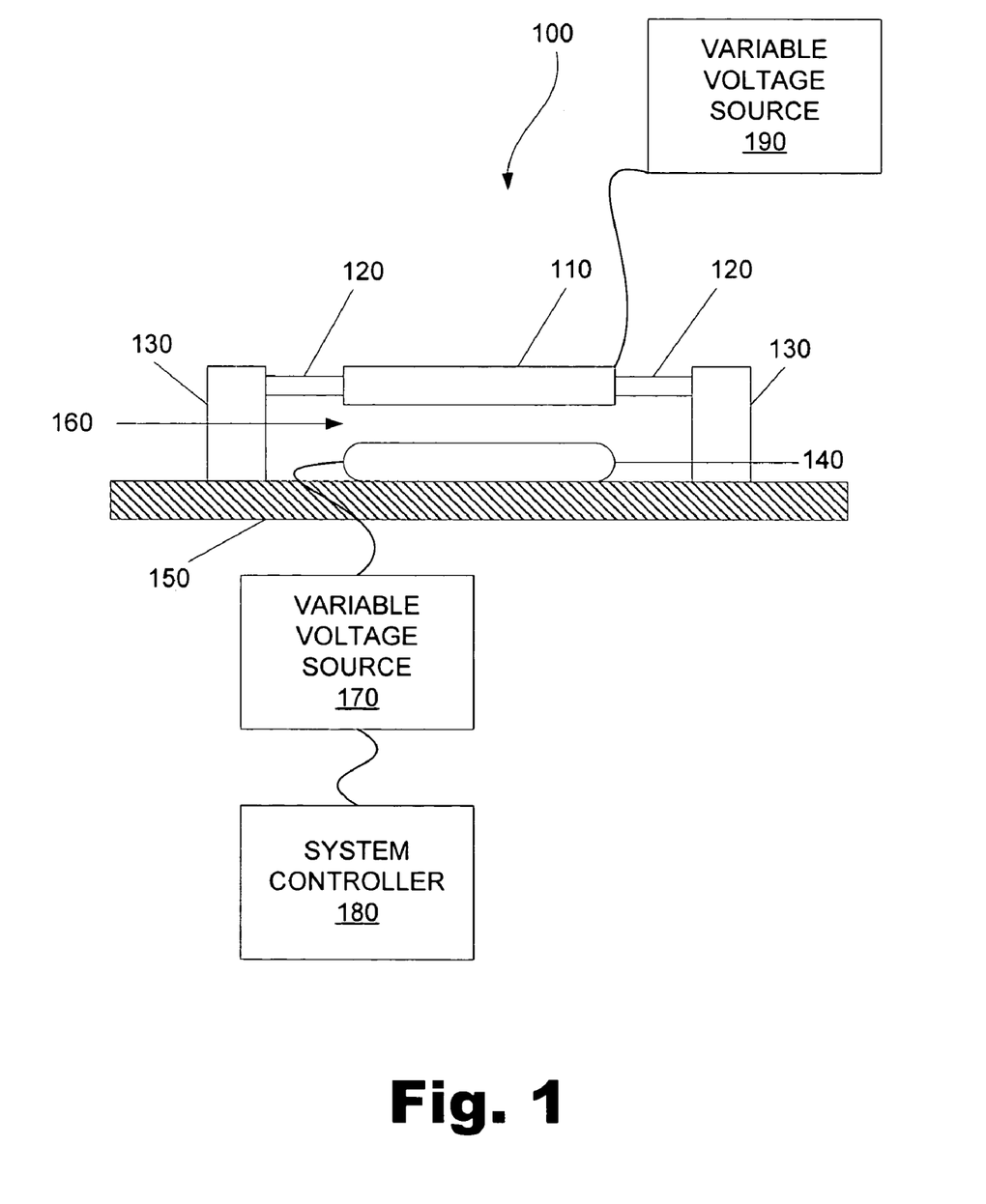
FIG. 1 is a cross-sectional view illustrating a DLD pixel cell according to one exemplary embodiment.

FIG. 1 is a simple cross-sectional block diagram illustrating an exemplary embodiment of a micro-electromechanical system (MEMS) (100) according to one exemplary embodiment. The MEMS (100) illustrated in FIG. 1 is an exemplary embodiment of a diffractive light device (DLD) that may be incorporated into any number of image display devices including, but in no way limited to, television sets, video monitors, computer monitors, etc. While the MEMS (100) illustrated in FIG. 1 is a DLD, the present system and method may be incorporated into any number of MEMS devices. As shown in FIG. 1 the DLD disposed on a substrate (150) includes a pixel plate (110) suspended above a bottom charge plate (140). A gap (160) is formed between the pixel plate (110) and the bottom charge plate (140) due to the suspension of the pixel plate (110) by a number of flexures (120). Each of the flexures (120) illustrated in FIG. 1 are coupled to the pixel plate (110) and to a support post (130).

According to one exemplary embodiment, the bottom charge plate (140) is electrically coupled to a variable voltage source (170) or other controllable voltage source controlled by a system controller (180) and the pixel plate (110) is tied to a static supply voltage (190). The variable voltage source (170) or other controllable voltage source is configured to selectively vary a voltage level applied to the bottom charge plate (140). In response to the voltage level provided to the bottom charge plate (140), an electrostatic attraction may be induced to controllably vary the gap (160) between the pixel plate (110) and the bottom charge plate (140). The electrostatic attraction induced by the bottom charge plate (140) is opposed by the flexures (120). By knowing the spring constant of the flexures (120) and the electrostatic force exerted by the bottom charge plate (140) in response to applied voltages, the size of the variable gap (160) can be selectively controlled.

While the exemplary embodiment illustrated in FIG. 1 is described above with reference to a static supply voltage being supplied to the pixel plate (110) and a variable voltage being supplied to the bottom charge plate (140), any number of voltage configurations may incorporate the present system and method including, but in no way limited to, a configuration supplying a static supply voltage to the bottom charge plate (140) and a variable voltage to the pixel plate (110), or a variable voltage being supplied to both the bottom charge plate and the pixel plate.

The variable voltage source (170) coupled to the bottom charge plate (140) in the exemplary embodiment illustrated in FIG. 1 is a variable voltage source configured to receive a voltage command signal from a system controller (180) and to provide a reference voltage having a selected voltage level based on the voltage command signal. The system controller (180) may be any processor or other computing device configured to receive input data and produce output commands. Once produced, the reference voltage or voltages may generate an electrostatic attraction between the bottom charge plate (140) and the pixel plate (110).

As is shown in FIG. 1, the bottom charge plate (140) is fixedly coupled to the substrate (150). Consequently, by controllably varying the gap (160) between the pixel plate (110) and the bottom charge plate (140), the orientation of the pixel plate (110) with respect to a light source (not shown) may be controllably varied. This high degree of control may be used to precisely orient a number of DLDs to display an image composed of multiple color pixels in the presence of a light source (not shown).

While DLDs such as that illustrated in FIG. 1 have traditionally been used to produce a desired image, an undesirable color shift may occur as the temperature of the DLD varies during operation. As the temperature of the DLD changes due to various conditions such as exposure to an illumination source, the spring force exerted by the flexures (120) will change. With a variation in operation temperature, the modulus of elasticity of the material forming the flexures (120) will change. For example, an increase in operating temperature will decrease the modulus of elasticity of the material forming the flexures (120). In other words, the spring constant of the flexures (120) will decrease with increasing operational temperatures, thereby softening the flexures. This "softening" of the flexures (120), given fixed voltages and charges on the DLD, will cause the spacing of the gap (160) between the pixel plate (110) and the bottom charge plate (140) to decrease as the temperature of the DLD substrate (150) increases. This variation in the gap (160) between the pixel plate (110) and the bottom charge plate (140) reduces the precision of the DLD and consequently causes the resultant color to shift undesirably.

Figure 2:
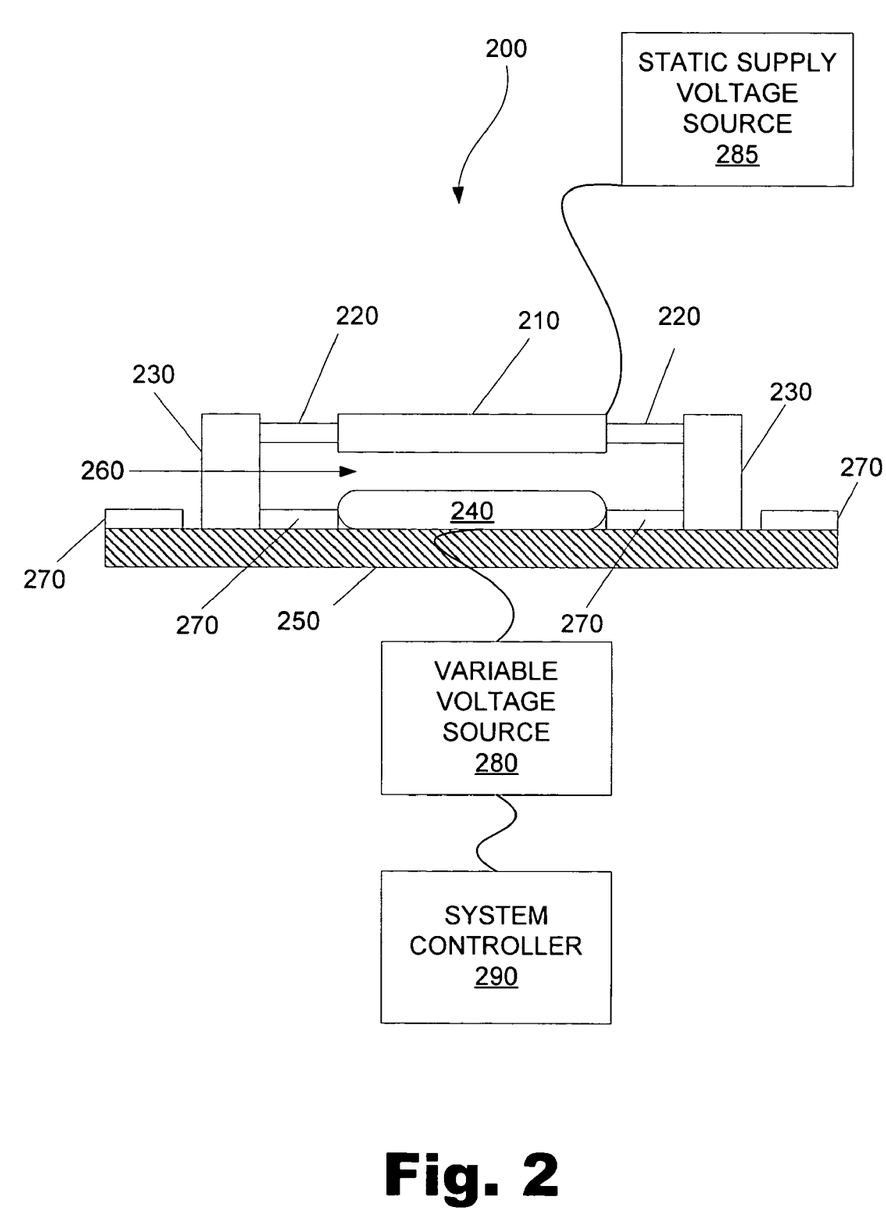
FIG. 2 is a cross-sectional view illustrating a DLD pixel cell including thermal sensors according to one exemplary embodiment.

FIG. 2 illustrates a simplified block diagram illustrating a DLD (200) configured to compensate for the above-mentioned thermal effects. As shown in FIG. 2, the DLD (200) has similar components to the DLD illustrated in FIG. 1. More specifically, the DLD (200) illustrated in FIG. 2 includes a pixel plate (210) disposed above a bottom charge plate (240), forming a gap (260) there between. The pixel plate (210) is held above the bottom charge plate (240) by a plurality of flexures (220) coupled to a support post (230) extruding from a substrate (250). Moreover, a variable voltage source (280) coupled to a system controller (290) is configured to provide a controllable voltage to the bottom charge plate (240) and a static supply voltage source (285) is electrically coupled to the pixel plate (210) to supply a static supply voltage. However, in contrast to the DLD illustrated in FIG. 1, the DLD (200) illustrated in FIG. 2 includes a plurality of thermal sensors (270) disposed in a number of locations on the substrate (250). The thermal sensors (270) disposed on the substrate (240) may be any type of thermal sensing device configured to provide a sufficient signal to noise ratio including, but in no way limited to, a thermal sense resistor or a diode bandgap. Moreover, any number of thermal sensors (270) may be disposed on or otherwise coupled to the substrate (250) of the DLD (200). According to one exemplary embodiment illustrated in FIG. 2, a plurality of thermal sensors (270) is coupled to the substrate (250).

The sensors (270) coupled to the substrate (270) of the DLD (200) illustrated in FIG. 2 are configured to approximate the temperature of the flexures (220) and provide a temperature compensated offset voltage to the variable voltage source (280) as will be further described below. A close approximation of the temperature of the flexures (220) may be acquired by the thermal sensors (270) disposed on the substrate (250) because the flexures (220) are thermally coupled to the substrate (250) through the support posts (230). Moreover, by positioning the thermal sensors (270) on the substrate (250), an estimation of the thermal energy affecting the flexures (220) may be made without interfering with the position or orientation of the pixel plate (210). According to one alternative embodiment, the thermal sensors (270) may be disposed on the support posts (230) or any other component of the DLD (200).

While the present system and method is described herein with respect to a single DLD, the present system and method may be employed into an array of DLDs wherein the entire array is tied to a single MEMS bias line, while each bottom charge plate (140) is electrically isolated from every other bottom charge plate and is connected to pixel driver circuitry that provides the desired voltage to the appropriate bottom charge plate. According to this exemplary embodiment, after a temperature read has been done, an appropriate temperature compensating offset may be placed on either the individual bottom charge plate voltages or the global MEMS bias signal. Similarly, the MEMS bias line may be electronically coupled to the bottom charge plate (140) and a variable voltage to each pixel plate (110).

Moreover, while a plurality of thermal sensors (270) are illustrated on a single DLD in FIG. 2, the present system and method may apply to any number of thermal sensor configurations. According to one exemplary embodiment, an array including multiple DLDs includes one or more thermal sense resistors which run around the periphery of the array or one or more thermal sense resistors which run through the middle of the array and which would give us an average temperature across the entire array. Alternative system configurations may also be implemented according to the present system and method.

Figure 3:
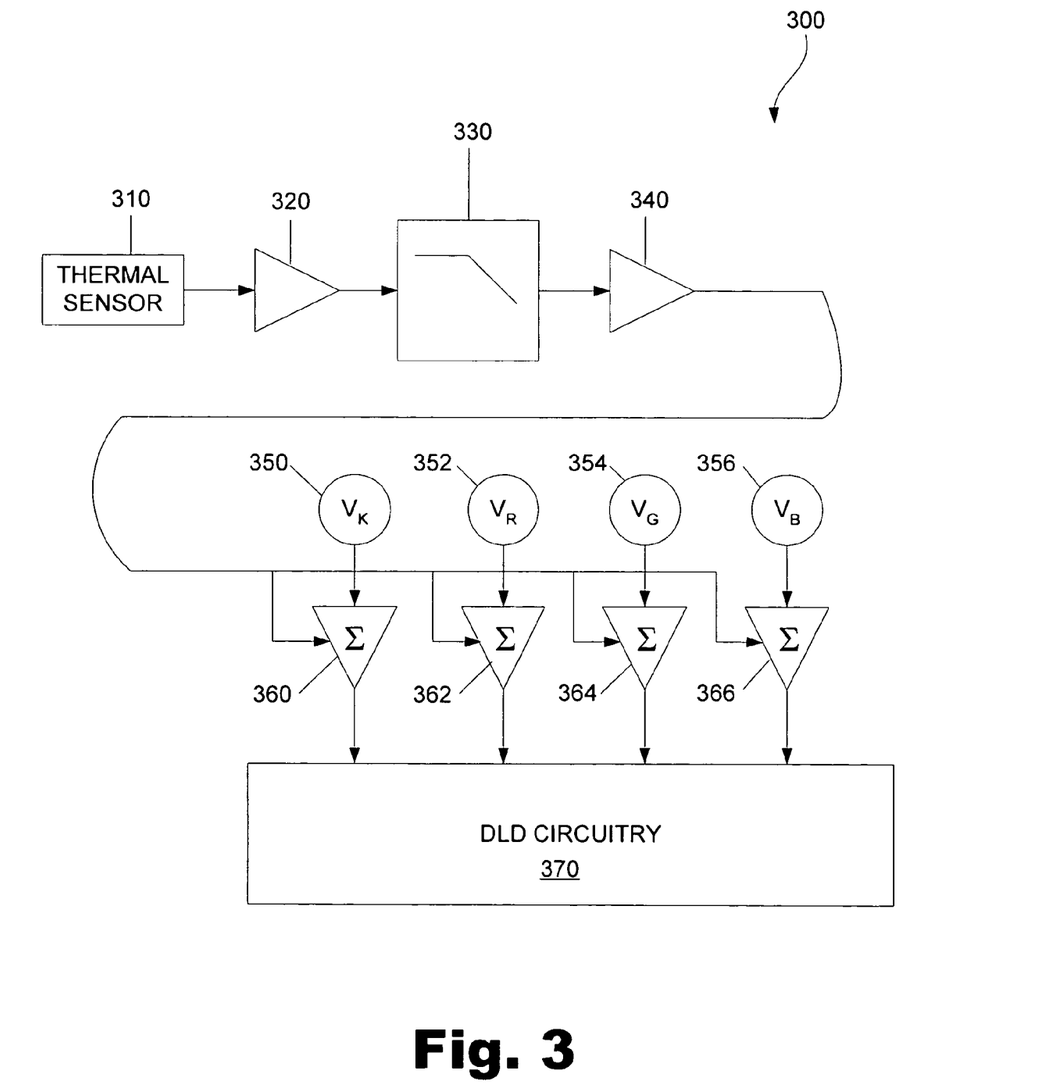
FIG. 3 is a simplified block diagram illustrating a control signal flow path according to one exemplary embodiment.

FIG. 3 is a flow chart illustrating a signal process path (300) of the output of the thermal sensor (310) according to one exemplary embodiment. As shown in FIG. 3, the output of the thermal sensor (310) may be electrically coupled to a plurality of components including a buffer amplifier (320), a low pass filter (330), and a scaler/offset amplifier (340). The scaler/offset amplifier (340) in turn is configured to output a temperature compensated offset voltage to a number of summing elements (360, 362, 364, 366). The summing elements (360, 362, 364, 366) are also communicatively coupled to a plurality of color voltage biases (350, 352, 354, 356) provided by a system controller (290; FIG. 2). As shown in FIG. 3, the color voltage biases provided to the summing elements (360, 362, 364, 366) may include a black component voltage bias (350), a red component voltage bias (352), a green component voltage bias (354), and a blue component voltage bias (356) according to one exemplary embodiment. Moreover, the outputs of the summing elements (360-366), which are configured to supply temperature compensated bias voltages, are subsequently coupled to the DLD circuitry (370). According to one exemplary embodiment, the DLD circuitry (370) may include, but is in no way limited to, a plurality of multiplexers and switching field-effect transistors (FETs). Implementation and operation of the system illustrated in FIGS. 2 and 3 will now be described in detail below.

Exemplary Implementation and Operation

Figure 4:
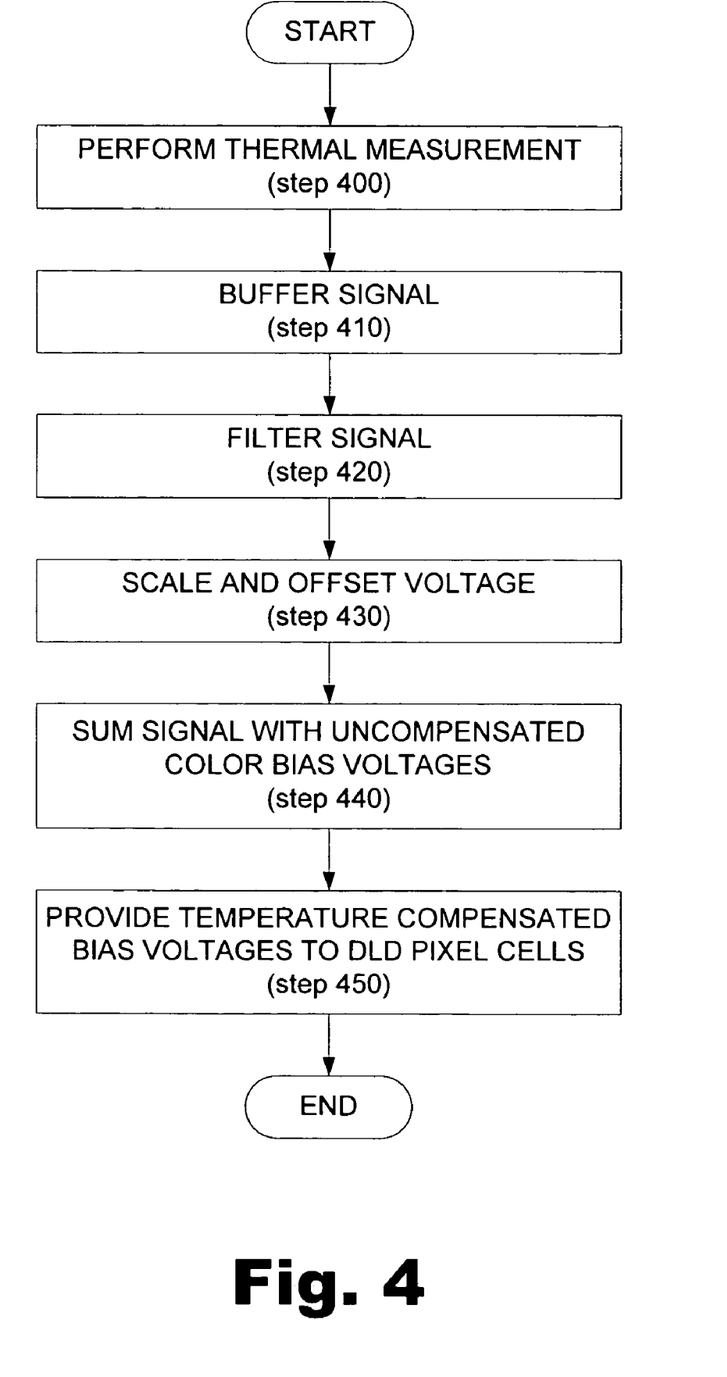
FIG. 4 is a flow chart illustrating a method for reducing thermal effects on a DLD according to one exemplary embodiment.

FIG. 4 is a flow chart illustrating a method of compensating for thermal effects in a DLD according to one exemplary embodiment. As shown in FIG. 4, the present method begins by first performing a thermal measurement (step 400). Once the thermal measurement has been performed, the resulting signal is buffered through a buffer amplifier (step 410) and filtered through a low pass filter (step 420). The signal is then passed through one or more scaler/offset amplifiers to scale and offset the voltage of the signal (step 430). The resulting voltage is a temperature compensated offset voltage which may then be summed with a number of uncompensated color bias voltages (step 440) to produce temperature compensated bias voltages. The temperature bias voltages are then provided to the DLD pixel cells (step 450) to compensate for thermal effects occurring on the DLD. The above-mentioned steps will now be illustrated in further detail below with reference to FIGS. 2 and 3.

As noted previously, the operation of a plurality of DLD pixel cells (200; FIG. 2) results in a transfer of thermal energy to the components of the DLD pixel cells. This increase of thermal energy can vary the spring force provided to the pixel plate (210; FIG. 2) by the flexure (220; FIG. 2) thereby varying the gap (260; FIG. 2) and orientation of the pixel plate (210; FIG. 2). In order to compensate for the thermal effects on the flexure (220; FIG. 2), the present DLD pixel cell (200; FIG. 2) provides one or more thermal sensors (270; FIG. 2) disposed on the DLD substrate (250; FIG. 2). During operation, the thermal sensor (270; FIG. 2) performs one or more thermal measurements sensing the substrate temperature at one or more locations on the DLD pixel cell (step 400). While the resulting measurement or average of multiple sensor measurements is not a direct measurement of the temperature of the flexure (220; FIG. 2), the resulting measurement is a close approximation of the temperature of the flexures because the flexures are thermally coupled to the substrate (250; FIG. 2) through the support posts (230; FIG. 2).

Once the thermal measurement has been performed (step 400), the output of the sensor (or combined output of multiple thermal sensors) (310; FIG. 3) is conditioned by several processes as illustrated in FIG. 3. First the signal transmitted from the thermal sensor (310) is buffered by an operational amplifier (step 410; FIG. 4) in order to boost the signal above the environmental noise. Once buffered, the signal is transmitted through a low pass filter (330) in order to remove any spurious (noise) signals (step 420; FIG. 4). Any noise that is present in the transmitted signal is likely highly transitory in nature and likely does not reflect actual temperature variations on the DLD substrate (250; FIG. 2). The cutoff of the low pass filter (330) may range in values to obtain a desired result. However, according to one exemplary embodiment, the low pass filter (330) has a cutoff around 10 Hz.

With the noise signals filtered from the transmitted signal (step 420; FIG. 4), the signal is then passed through a scaler/offset amplifier (340) to effectively scale and offset the voltage of the transmitted signal (step 430; FIG. 4). In order to effectively scale and offset the voltage of the transmitted signal (step 430; FIG. 4), the signal is passed through one or more operational amplifiers (340). The op amp (340) both scales and offsets the voltage of the transmitted signal such that the offset and voltage of the transmitted signal substantially correspond to the requirements of the voltage summing scheme into which they feed. Accordingly, the voltage of the received signal is scaled such that the resulting voltage will compensate for the softening of the flexures (220; FIG. 2) at the sensed temperature. According to one exemplary embodiment, the op amp (340) is configured to change a voltage supplied to the bottom charge plate (240; FIG. 2) a quantity proportional to the amount of change in spring constant supplied by the flexures (220; FIG. 2) at the sensed temperature. Once scaled and offset, the transmitted signal functions as a temperature compensated offset voltage.

When the signal complies with the requirements of the voltage summing scheme, temperature compensated offset voltage is summed with a plurality of uncompensated color voltage biases (step 440; FIG. 4). The color voltage biases (350, 352, 354, 356) that are provided to the summing circuits (360, 362, 364, 366) to be summed with the temperature compensated offset voltage are provided by the system controller (290; FIG. 2). The color voltage biases (350-356) are provided at a voltage level that would be provided to the DLD circuitry assuming no thermal effects in the DLD (200; FIG. 2). According to one exemplary embodiment illustrated in FIG. 3, the color voltage biases transmitted to the summing circuits (360-366) by the system controller (290; FIG. 2) may be separated into color components of a color scheme such as a red-green-blue (RGB) color scheme. The slope of the temperature compensated offset voltage (voltage vs. temperature) is a compensation ratio that, when summed with the uncompensated color bias voltages (350, 352, 354, 356), produces "temperature compensated color voltages."

Once produced by the summing elements (360-366), the resulting temperature compensated color voltages are transmitted to the DLD pixel cells (step 450; FIG. 4). The temperature compensated color voltages are then used according to traditional DLD circuit schemes—being feed to pixel cells through multiplexers and switching FETs to produce a desired color pattern. By summing the temperature compensated offset voltage with the color voltage biases prior to transmission to the DLD circuitry (370), color shifting due to thermal effects on the flexures (220; FIG. 2) are effectively reduced.

Alternative Embodiments

The system and method illustrated above may be incorporated into any number of DLD configurations in order to compensate for thermal effects. According to one exemplary configuration illustrated in FIG. 5, the thermal sensor (510) may be communicatively coupled to a buffer amplifier (520) and subsequently to a low pass filter (530) as described above with reference to FIG. 3. However, the exemplary embodiment illustrated in FIG. 5 couples the signal leaving the low-pass filter (530) to a digitizer (540) which is subsequently coupled to a system controller (550). The system controller (550), in turn, is communicatively coupled to a look up table (560) or other data storage device and to voltage summing circuitry (570) that is then coupled to the DLD circuitry (580).

Figure 5:
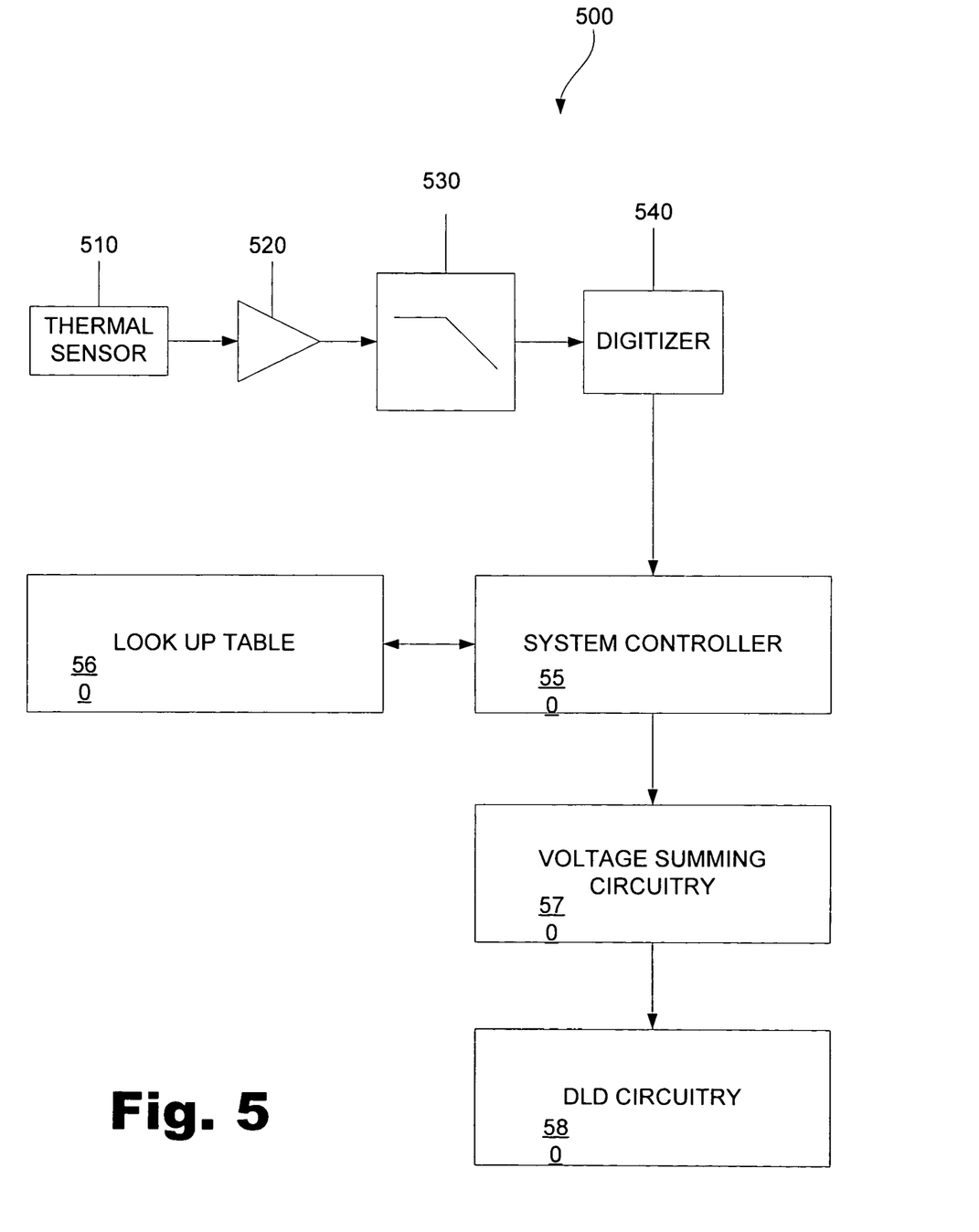
FIG. 5 is a simplified block diagram illustrating a control signal flow path according to one exemplary embodiment.
Figure 6:
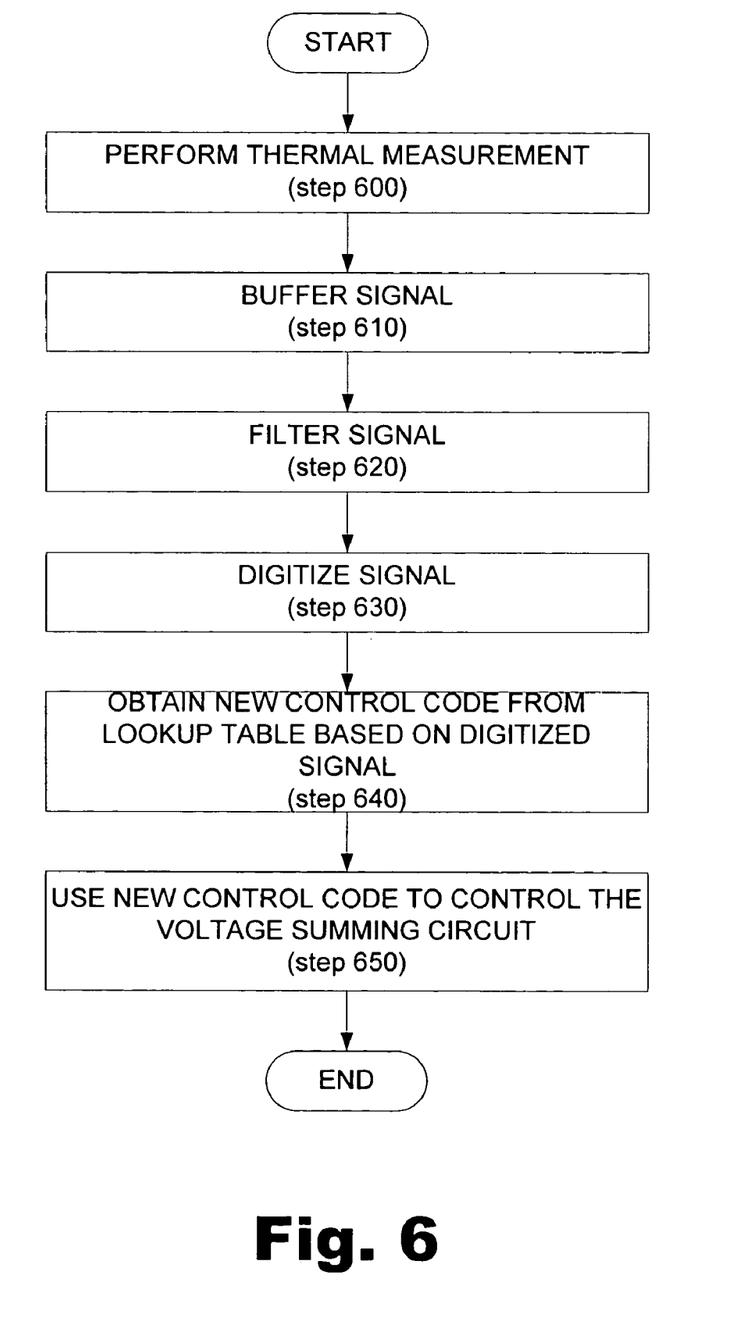
FIG. 6 is a flow chart illustrating a method for reducing thermal effects on a DLD according to one exemplary embodiment.

FIG. 6 illustrates an exemplary method of compensating for thermal effects on a DLD using the configuration illustrated in FIG. 5. As shown in FIG. 6, the method begins by performing a thermal measurement (step 600) thereby producing a signal, buffering (step 610) the signal, and filtering the signal (620) as described above with reference to FIG. 4. However, once the transmitted signal has been filtered (step 620), it is transmitted to a digitizer (540; FIG. 5) where the transmitted signal is digitized (step 630) into a digital code corresponding to the thermal measurements. The digital code may then be transmitted to the system controller (550; FIG. 5). Once received in the system controller (550; FIG. 5), the system controller may then use the digital code as an address to a lookup table (560; FIG. 5) to obtain a control code (step 640). The control code obtained from the look up table (560; FIG. 5) may then be used by the system controller (550; FIG. 5) to control the voltage summing circuit (step 650) in either a digital or analog fashion. Converting the transmitted signal into a digital code corresponding to control codes in a look up table (560; FIG. 5) allows for greater flexibility in compensating for the thermal effects in a DLD. According to one exemplary embodiment, the look up table (560; FIG. 5) may be soft programmable, allowing the resulting control codes to compensate for a number of nonlinear effects of either the sensors (270; FIG. 2), the voltage summing elements (360; FIG. 3), the spring constant of the flexures (220; FIG. 2), or any combination thereof.

According to yet another alternative embodiment illustrated in FIG. 7, the exemplary signal process path (700) includes a thermal sensor (710) communicatively coupled to a buffer amplifier (720) and subsequently to a low pass filter (730) as described above with reference to FIG. 5. Also similar to the embodiment illustrated in FIG. 5, the exemplary embodiment illustrated in FIG. 7 couples the signal leaving the low-pass filter (730) to a digitizer (740) which is subsequently coupled to a system controller (750). However, as illustrated in FIG. 7, the system controller (750), in turn, is communicatively coupled to a digital to analog converter (760) and to the DLD circuitry (770).

Figure 7:
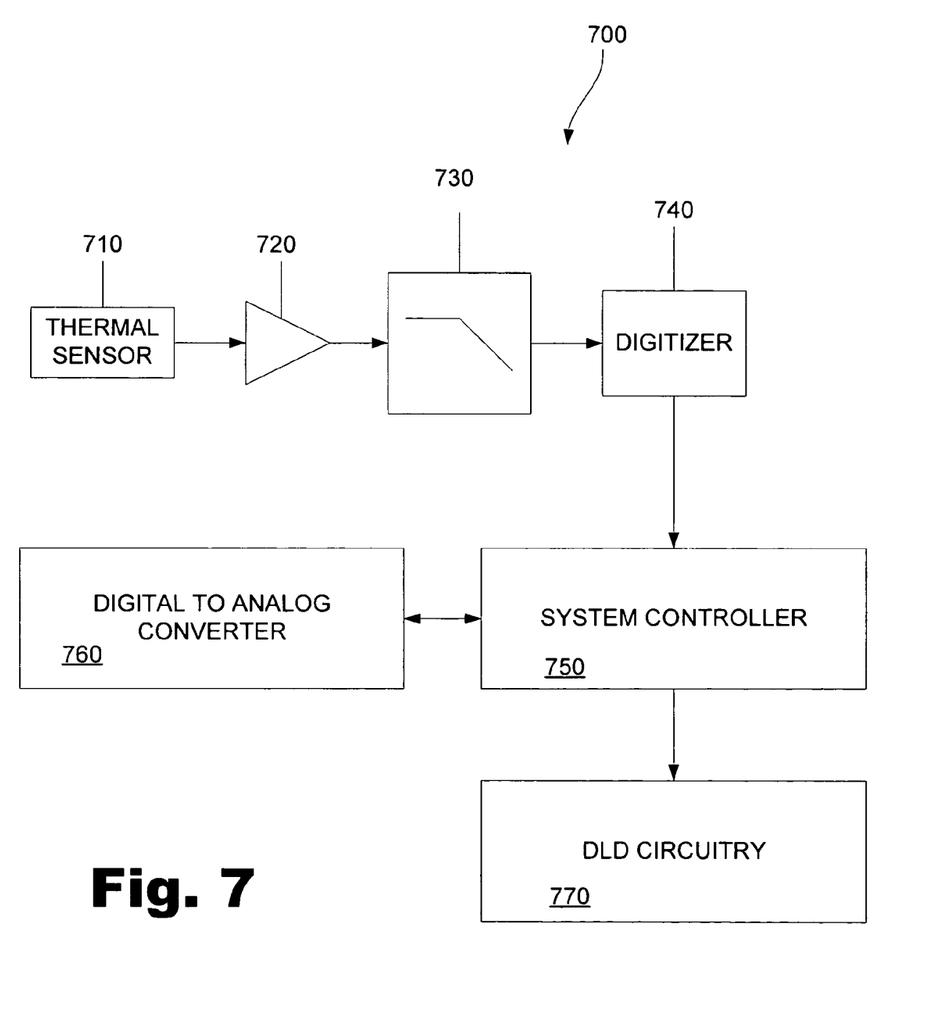
FIG. 7 is a simplified block diagram illustrating a control signal flow path according to one exemplary embodiment.
Figure 8:
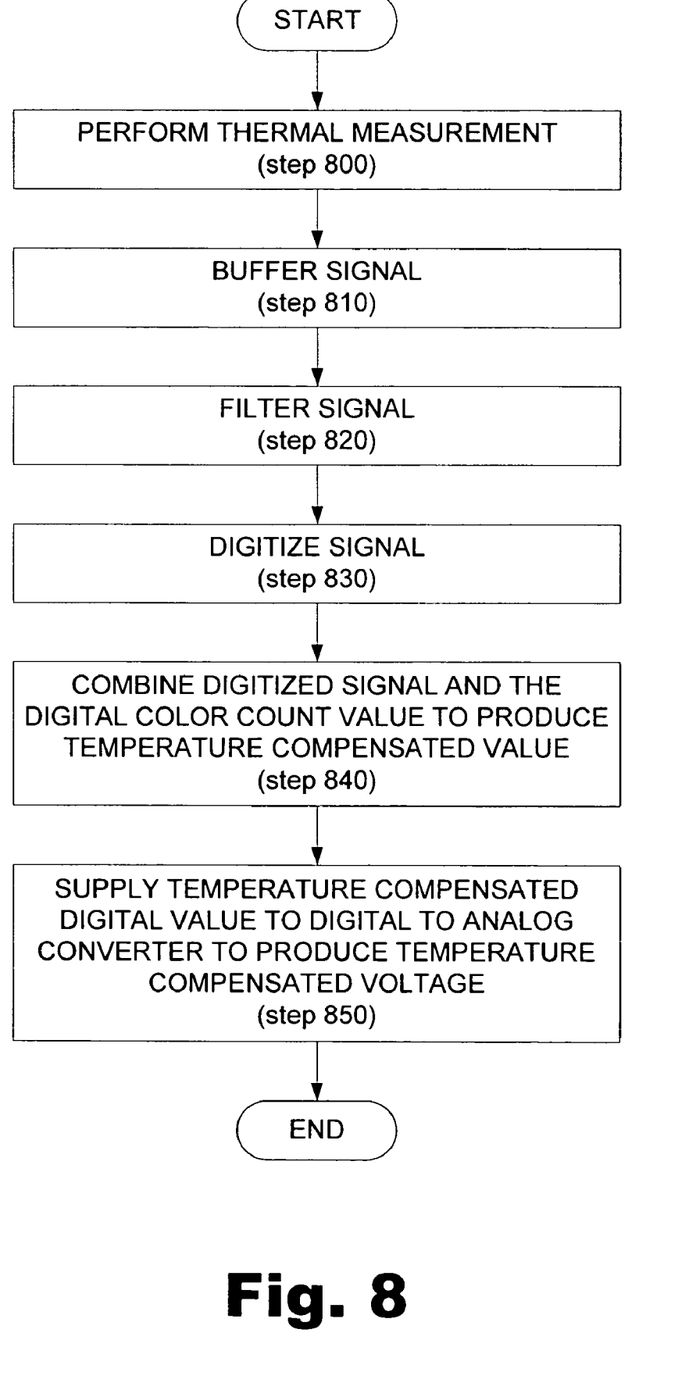
FIG. 8 is a flow chart illustrating a method for reducing thermal effects on a DLD according to one exemplary embodiment.

The flow chart illustrated in FIG. 8 illustrates the operation of the system illustrated in FIG. 7. As shown in FIG. 8, the method begins by performing a thermal measurement (step 800) thereby producing a signal, buffering (step 810) the signal, filtering the signal (step 820), digitizing the signal (step 830) and transmitting the signal to the system controller similar to the method illustrated in FIG. 6. However, once the digitized signal has been transmitted to the system controller (750; FIG. 7), the system controller combines the digital sum of a "color count" (i.e., the digital uncompensated green, red, blue, or other primary color) and the digitized thermal signal (step 840). This combined digital signal represents a temperature compensated value that may be used to produce the desired pixel gap at the above measured temperature. The combined digital signal is then transmitted to the DAC (step 850). The combined digital signal drives the DAC to produce a temperature compensated voltage which correspond to the appropriate "pixel voltages" and then routes this voltage to the appropriate pixels as described above. Consequently, the various system controllers or processors illustrated herein may be considered, in various embodiments, to include a processor readable medium having instructions thereon for: sensing a temperature change of a DLD; and modifying a voltage provided to the DLD in response to the sensed temperature change. Modifying a voltage provided to the DLD may include receiving a signal associated with the sensed temperature change; and generating a temperature compensated offset voltage based on the signal. The processor readable medium may further have instructions thereon for: digitizing the signal; providing the digitized signal to a data storage device; and receiving a temperature compensated offset voltage value from the data storage device. The data storage device may include a data lookup table. The processor readable medium may further have instructions thereon for: digitizing the signal; combining the digitized signal with a digital color count; and converting the combined signal to an analog voltage.

In conclusion, the present system and method for reducing the thermal effects in a DLD provides one or more sensors on the DLD substrate. The measurements taken by the sensor or sensors is then used to generate a temperature compensated offset voltage which compensates for the thermal effects experienced by the DLD. Consequently, the present system and method provides a low-cost solution for generating stable color generation, real time, as the DLD temperature varies.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:
1. A diffractive light device (DLD) comprising:
  a substrate;
  a force plate disposed on said substrate, said force plate configured to produce an electrostatic force in response to an applied voltage;
  a pixel plate supported by a flexure adjacent to said force plate, wherein a position of said pixel plate is controlled by said electrostatic force and by said flexure coupled to said pixel plate to display a pixel of an image;
  a temperature sensor thermally coupled to said flexure, without affecting movement of said flexure, and outputting a thermal measurement indicative of a temperature of said flexure; and
  a circuit that generates and applies a temperature compensated voltage to said force plate in response to said thermal measurement produced by said temperature sensor.
2. The DLD of claim 1, wherein said circuit comprises:
  an offset voltage generator, wherein said offset voltage generator is configured to generate a temperature compensated offset voltage based on said thermal measurement; and a summing element for adding said offset voltage to a reference voltage to produce said temperature compensated voltage.

3. The DLD of claim 2, wherein said temperature compensated offset voltage is configured to compensate for a change in spring force exerted on said pixel plate by said flexure at a measured temperature.

4. The DLD of claim 2, wherein said offset voltage generator comprises:
a buffer amplifier;
a low pass filter electrically coupled to said buffer amplifier; and
a scaler/offset amplifier electrically coupled to said low pass filter.

5. The DLD of claim 2, wherein said offset voltage generator comprises:
a signal digitizer configured to digitize said thermal measurement;
a system controller communicatively coupled to said signal digitizer; and
a data storage device communicatively coupled to said system controller, wherein said data storage device contains a plurality of offset voltage values associated with said digitized thermal measurement.

6. The DLD of claim 2, wherein said offset voltage generator comprises:
a signal digitizer configured to digitize said thermal measurement;
a system controller communicatively coupled to said digitizer, said system controller configured to combine said digitized thermal measurement to an uncompensated digital color count; and
a digital to analog converter communicatively coupled to said system controller, wherein said digital to analog converter is configured to convert said combined digital signal into a thermally compensated analog voltage.

7. The DLD of claim 2, further comprising a variable voltage source communicatively coupled to said offset voltage generator, wherein said variable voltage source is configured to generate a temperature compensated offset voltage in response to a command signal received from said offset voltage generator.

8. The DLD of claim 2, wherein said summing element comprises a summing circuit, wherein said summing circuit is configured to combine said temperature compensated offset voltage with each of a plurality of color specific voltages to produce a temperature compensated voltage corresponding to each of a plurality of colors produced by pixel elements of said DLD.

9. The DLD of claim 1, wherein said temperature sensor comprises one of a thermal sense resistor or a diode bandgap.

10. The DLD of claim 9, wherein said temperature sensor is configured to measure an average temperature of flexures in an array of DLDs.

11. A micro-electro mechanical system (MEMS) comprising:
a substrate;
a pixel plate coupled to said substrate;
a force plate disposed on said substrate adjacent to said pixel plate, wherein said force plate is configured to exert an electrostatic force on said pixel plate; and
a temperature sensor thermally coupled to said MEMS;
wherein said MEMS is configured to adjust said electrostatic force in response to a temperature measurement performed by said temperature sensor.

12. The MEMS of claim 11, further comprising:
a support post extruding from said substrate; and
a flexure coupling said pixel plate to said support post, wherein said flexure is configured to exert a spring force on said pixel plate opposing said electrostatic force;
said spring force predictably varying with a variation in temperature.

13. The MEMS of claim 12, wherein said MEMS is further configured to vary said electrostatic force to compensate for a variation in spring force provided by said flexure at a measured temperature.

14. The MEMS of claim 12, further comprising an offset voltage generator, wherein said offset voltage generator is configured to vary said electrostatic force based on said temperature measurement.

15. The MEMS of claim 14, wherein said temperature compensated offset voltage generator is configured to produce an offset voltage to compensate for said variation in spring force provided by said flexure.

16. The MEMS of claim 15, wherein said offset voltage generator comprises:
a buffer amplifier;
a low pass filter electrically coupled to said buffer amplifier; and
a scaler/offset amplifier electrically coupled to said low pass filter.

17. The MEMS of claim 14, wherein said offset voltage generator comprises:
a signal digitizer configured to digitize said temperature measurement;
a system controller communicatively coupled to said signal digitizer; and
a data storage device communicatively coupled to said system controller, wherein said data storage device contains a plurality of offset voltage values associated with said digitized temperature measurement.

18. The MEMS of claim 14, wherein said offset voltage generator comprises
a signal digitizer configured to digitize said thermal measurement;
a system controller communicatively coupled to said digitizer, said system controller configured to combine said digitized thermal measurement to a uncompensated digital color count; and
a digital to analog converter communicatively coupled to said system controller, wherein said digital to analog converter is configured to convert said combined digital signal into a thermally compensated analog voltage.

19. The MEMS of claim 14, further comprising a variable voltage source communicatively coupled to said offset voltage generator, wherein said variable voltage source is configured to generate a temperature compensated offset voltage in response to a command signal received from said offset voltage generator.

20. The MEMS of claim 14, further comprising a summing circuit, wherein said summing circuit is configured to combine a temperature compensated offset voltage from said offset voltage generator with each of a plurality of color specific voltages to produce an electrostatic force corresponding to each of a plurality of colors produced by said pixel plate.

21. The MEMS of claim 11, wherein said temperature sensor comprises one of a thermal sense resistor or a diode bandgap.

22. The MEMS of claim 11, further comprising:
an array of corresponding pixel and force plates; and
an offset voltage generator that applies an offset voltage based on said temperature measurement to a global MEMS bias signal used by said force plates.

23. An image display device comprising:
a system controller;
a variable voltage source communicatively coupled to said system controller; and
an array of DLDs communicatively coupled to said variable voltage source, each DLD of said DLD array including a substrate, a force plate disposed on said substrate, said force plate configured to produce an electrostatic force in response to a voltage applied by said voltage source, a pixel plate disposed adjacent to said force plate, wherein a position of said pixel plate is determined by said electrostatic force and a flexure coupled to said pixel plate, and a temperature sensor thermally coupled to said DLD so as to determine a temperature of said flexure, wherein said image display device is configured to vary said electrostatic force in response to a temperature measurement performed by said temperature sensor.

24. The image display device of claim 23, wherein said image display device is configured to vary said electrostatic force by varying a temperature-compensated offset voltage to compensate for a change in spring force exerted on said pixel plate by said flexure at a measured temperature.

25. The image display device of claim 23, further comprising an offset voltage generator configured to generate said temperature compensated offset voltage.

26. The image display device of claim 25, wherein said offset voltage generator comprises:
a buffer amplifier;
a low pass filter electrically coupled to said buffer amplifier; and
a scaler/offset amplifier electrically coupled to said low pass filter.

27. The image display device of claim 25, wherein said offset voltage generator comprises:
a signal digitizer communicatively coupled to said system controller, said signal digitizer being configured to digitize said thermal measurement; and
a data storage device communicatively coupled to said system controller, wherein said data storage device contains a plurality of offset voltage values associated with said digitized thermal measurement.

28. The image display device of claim 25, wherein said offset voltage generator comprises:
a signal digitizer configured to digitize said thermal measurement;
a system controller communicatively coupled to said digitizer, said system controller configured to combine said digitized thermal measurement to a uncompensated digital color count; and
a digital to analog converter communicatively coupled to said system controller, wherein said digital to analog converter is configured to convert said combined digital signal into a thermally compensated analog voltage.

29. The image display device of claim 23, wherein said temperature sensor is configured to measure an average temperature of flexures in said array of DLDs.

30. A diffractive light device (DLD) comprising:
a substrate;
a means for producing an electrostatic force disposed on said substrate, wherein said electrostatic force is produced in response to an applied voltage;
a means for diffracting light disposed adjacent to said electrostatic force producing means, wherein a position of said light diffracting means is influenced by a means for flexing coupled to said means for diffracting light; and
a means for sensing temperature thermally coupled to said DLD, wherein said means for sensing temperature is configured to produce a temperature compensated voltage on said means for producing an electrostatic force in response to a thermal measurement.

31. The DLD of claim 30, further comprising an offset voltage generator, wherein said offset voltage generator is configured to generate a temperature compensated offset voltage based on said thermal measurement.

32. The DLD of claim 31, wherein said temperature compensated offset voltage is configured to compensate for a change in spring force exerted on said means for diffracting light by said means for flexing at a measured temperature.

33. The DLD of claim 31, wherein said offset voltage generator comprises:
a buffer amplifier;
a low pass filter electrically coupled to said buffer amplifier; and
a scaler/offset amplifier electrically coupled to said low pass filter.

34. The DLD of claim 31, wherein said offset voltage generator comprises:
a means for digitizing said thermal measurement;
a means for controlling said DLD communicatively coupled to said signal digitizer; and
a means for storing data communicatively coupled to said controlling means, wherein said storage means contains a plurality of offset voltage values associated with said digitized thermal measurement.

35. The DLD of claim 34, further comprising a means for generating a variable voltage communicatively coupled to said controlling means, wherein said variable voltage generating means is configured to generate a temperature compensated offset voltage in response to a command signal received from said controlling means.

36. The DLD of claim 30, further comprising a means for summing voltages, wherein said means for summing is configured to combine said temperature compensated offset voltage with a color voltage bias to produce said temperature compensated voltage.

37. The DLD of claim 36, wherein said color voltage bias comprises a non-compensated voltage bias.

38. The DLD of claim 30, wherein said temperature sensing means comprises one of a thermal sense resistor or a diode bandgap.

39. A method of compensating for thermal effects in a DLD comprising:
measuring a temperature of said DLD;
generating a temperature compensated offset voltage associated with an effect said temperature will have on said DLD; and
producing a temperature compensated voltage on said DLD using said temperature compensated offset voltage, wherein applying said temperature compensated voltage to said DLD compensates for said thermal effects.

40. The method of claim 39, wherein said thermal effects comprise a change in spring force exerted by a flexure on a pixel plate.

41. The method of claim 39, wherein said generating a temperature compensated offset voltage comprises:
generating a signal in response to said measurement; and
providing said signal to an offset voltage generator, wherein said offset voltage generator is configured to generate said temperature compensated offset voltage based on said signal.

42. The method of claim 41, wherein said offset voltage generator comprises
  a buffer amplifier;
  a low pass filter electrically coupled to said buffer amplifier; and
  a scaler/offset amplifier electrically coupled to said low pass filter.

43. The method of claim 41, wherein said generating a temperature compensated offset voltage comprises:
  digitizing said signal;
  transmitting said digitized signal to a system controller;
  associating said digitized signal to a corresponding temperature compensated offset voltage value stored in a memory storage device; and
  commanding a variable voltage source to produce a voltage corresponding to said temperature compensated voltage value.

44. The method of claim 41, wherein said generating a temperature compensated offset voltage comprises:
  digitizing said signal;
  transmitting said digitized signal to a system controller;
  combining said digitized signal to a digital color count; and
  converting said combined signal to an analog voltage.

45. The method of claim 39, wherein said measuring a temperature of said DLD comprises:
  thermally coupling a thermal sensor to said DLD; and
  sensing a temperature of said DLD.

46. The method of claim 45, wherein said thermal sensor comprises one of a thermal sensor resistor or a diode bandgap.

47. The method of claim 46, wherein said thermal sensor measures an average temperature of an array of DLDs.

48. The method of claim 39, wherein said producing a temperature compensated voltage on said DLD comprises summing said temperature compensated offset voltage with an uncompensated voltage bias.

49. A processor readable medium having instructions thereon that are executable by a processor for:
  sensing a temperature change of a DLD; and
  modifying a voltage provided to said DLD in response to said sensed temperature change.

50. The processor readable medium of claim 49, wherein said modifying a voltage provided to said DLD comprises:
  receiving a signal associated with said sensed temperature change; and
  generating a temperature compensated offset voltage based on said signal.

51. The processor readable medium of claim 50, wherein said processor readable medium further has instructions thereon that are executable by a processor for:
  digitizing said signal;
  providing said digitized signal to a data storage device; and
  receiving a temperature compensated offset voltage value from said data storage device.

52. The processor readable medium of claim 51, wherein said data storage device comprises a data lookup table.

53. The processor readable medium of claim 50, wherein said processor readable medium further has instructions thereon that are executable by a processor for:
  digitizing said signal;
  combining said digitized signal with a digital color count; and
  converting said combined signal to an analog voltage.

* * * * *